(12) United States Patent
Nachenberg

(10) Patent No.: US 8,015,114 B1
(45) Date of Patent: Sep. 6, 2011

(54) SYSTEMS AND METHODS FOR ENCOURAGING RENEWAL OF SECURITY-SOFTWARE SUBSCRIPTIONS

(75) Inventor: Carey S. Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 187 days.

(21) Appl. No.: 12/346,186

(22) Filed: Dec. 30, 2008

(51) Int. Cl.
*G06F 21/00* (2006.01)
(52) U.S. Cl. ............................................. 705/59; 726/24
(58) Field of Classification Search .............. 705/50–79; 726/24
See application file for complete search history.

(56) References Cited

U.S. PATENT DOCUMENTS

| | | | |
|---|---|---|---|
| 2002/0164025 A1* | 11/2002 | Raiz et al. ..................... | 380/231 |
| 2003/0191958 A1* | 10/2003 | Gartside et al. ............... | 713/200 |
| 2006/0253324 A1* | 11/2006 | Miller ............................ | 705/14 |

* cited by examiner

*Primary Examiner* — Andrew J. Fischer
*Assistant Examiner* — Thomas West
(74) *Attorney, Agent, or Firm* — Advantedge Law Group

(57) ABSTRACT

A computer-implemented method for encouraging the renewal of security-software subscriptions may comprise: 1) determining that a security-software subscription for a computing system has expired, 2) after determining that the security-software subscription has expired, continuing to at least periodically retrieve vendor-supplied security updates and to monitor the computing system for potential security threats, 3) detecting at least one security threat to the computing system, 4) notifying a user of the computing system of the security threat, and then 5) prompting the user to renew the security-software subscription. Corresponding systems and computer-readable media are also disclosed.

20 Claims, 7 Drawing Sheets

SYSTEMS AND METHODS FOR ENCOURAGING RENEWAL OF SECURITY-SOFTWARE SUBSCRIPTIONS

BACKGROUND

While many computer-security vendors offer trial or evaluation versions of their computer-security programs (e.g., antivirus and antispyware programs), recent research indicates that a majority of users of such trialware may not encounter malicious code ("malware") during the relatively-short trial period typically provided by security vendors (which, in some cases, is no longer than three months). In this scenario, the user may fail to appreciate the need for the computer-security software and may decide to uninstall the software and/or decline to renew their security-software subscription, leaving their security software out of date and their computer unprotected.

Unfortunately, recent research indicates that a substantial portion of users may encounter malware soon after uninstalling trial versions of computer-security software (e.g., within the first ten months of installing trial versions of computer-security software). As such, the instant disclosure identifies a need for demonstrating the necessity of computer-security software by detecting and notifying a user of new security threats, even after the user's security-software subscription has expired.

SUMMARY

As will be described in greater detail below, the instant disclosure generally relates to systems and methods for encouraging consumers to sign up for or renew subscriptions to security software. In one example, a method for accomplishing this task may comprise: 1) continuing, even after a user's security-software subscription has expired, to at least periodically a) retrieve vendor-supplied security updates (such as virus-definition or malware-detection-heuristic updates) and b) monitor the user's computing system for potential security threats, 2) detecting at least one security threat to the computing system, 3) notifying the user of the security threat, and then 4) prompting the user to renew his/her security-software subscription.

In some examples, the system may, when notifying the user of the security threat, display a notification that: 1) identifies the security threat, 2) indicates that the user's security-software subscription has expired, and 3) offers to remove the security threat for free (i.e., without requiring the user to renew his/her security-software subscription). In this example, the computer-security software may only offer to perform a limited number of free threat removals (e.g., 1 or 2) before requiring the user to renew his/her security-software subscription. In other examples, the system may offer to remove the detected security threat only if the user renews his/her security-software subscription.

In one embodiment, the computer-security software may transparently (i.e., in the background or without informing the user) monitor the computing system for potential security threats. For example, the computer-security software may monitor the computing system late at night or during periods of inactivity. The computer-security software may also attempt to incentivize the user to renew his/her security-software subscription by offering a discount on the normal price of the security-software subscription.

If the user declines to renew the security-software subscription, then the functionality of the user's computer-security software may be reduced by, for example, disabling the software's ability to remove security threats, to repair damage caused by security breaches, and/or to download virus-definition updates. If and when the user renews his/her security-software subscription, the full functionality of the computer-security software may be restored.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
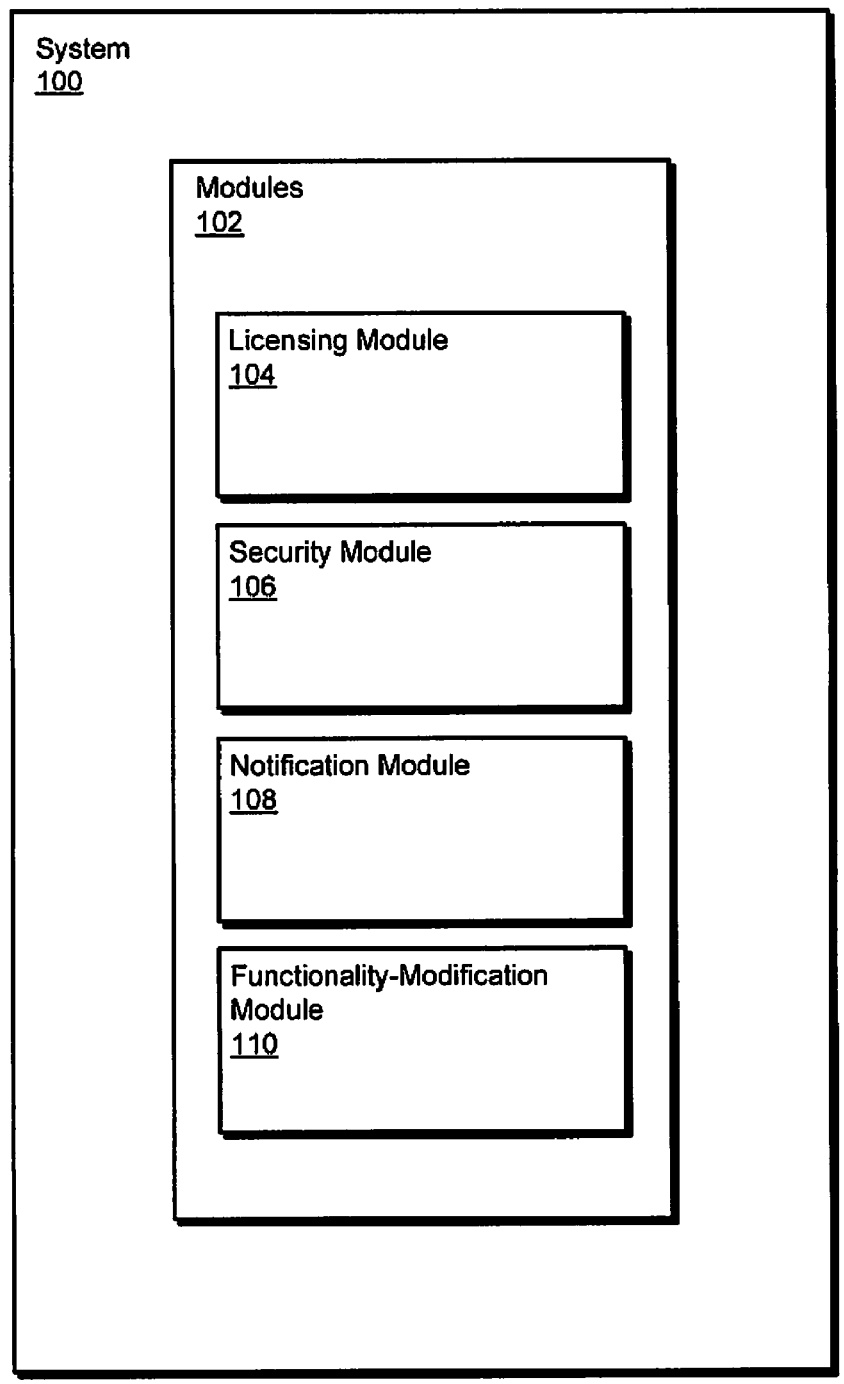
FIG. 1 is a block diagram of an exemplary system for encouraging the renewal of security-software subscriptions according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for encouraging consumers to sign up for or renew subscriptions to security software. The phrase "security software" may refer to computer programs designed to identify, detect, neutralize, and/or eliminate vulnerabilities and malicious software, such as worms, rootkits, Trojans, phishing attacks, spambots, or the like. Similarly, the phrase "security-software subscriptions" may refer to recurring fees paid to security vendors in return for continually-updated security-software solutions. For example, a security vendor may provide new or continually-updated virus-definition sets and/or malware-detection heuristics to users of its security-software program in return for a recurring monthly or annual fee.

Figure 2:
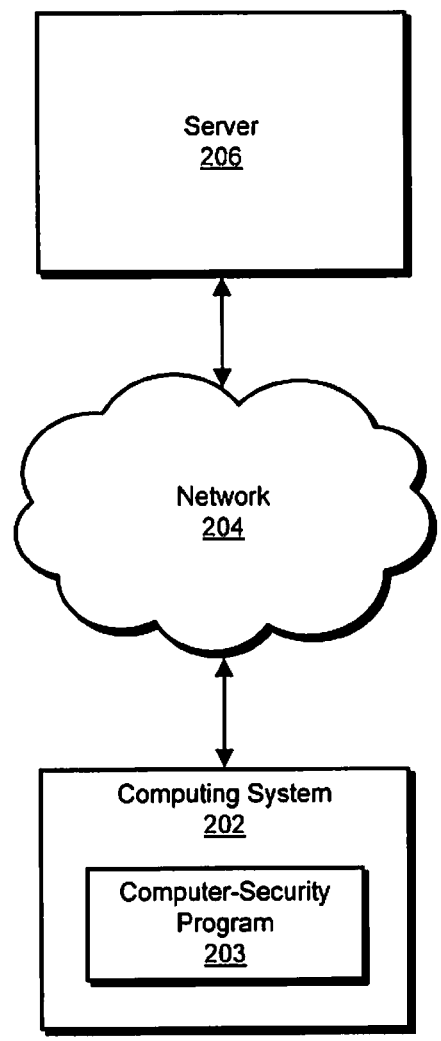
FIG. 2 is a block diagram of an exemplary system for encouraging the renewal of security-software subscriptions according to an additional embodiment.

The following will provide, with reference to FIGS. 1-2, detailed descriptions of exemplary systems for encouraging the renewal of security-software subscriptions. A detailed description of a corresponding computer-implemented method will be provided in connection with FIGS. 3-5. In addition, detailed descriptions of an exemplary computing system and network architecture capable of implementing one or more of the embodiments described herein will be provided in connection with FIGS. 6-7, respectively.

FIG. 1 is a block diagram of an exemplary system 100 for encouraging the renewal of security-software subscriptions. As illustrated in this figure, exemplary system 100 may comprise one or more modules 102 for performing one or more tasks. For example, as will be explained in greater detail below, exemplary system 100 may comprise a licensing module 104 for monitoring and managing security-software subscriptions for users. Exemplary system 100 may also comprise a security module 106 for detecting and removing security threats on computing systems.

Exemplary system 100 may further comprise a notification module 108 for notifying users of detected security threats and the status of their security-software subscriptions. In addition, exemplary system 100 may comprise a functionality-modification module 110 for modifying the functionality of computer-security programs on computing systems based on the status of users' security-software subscription. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules configured to run on one or more computing devices, such as the devices illustrated in FIG. 2 (e.g., computing system 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

FIG. 2 is a block diagram of an exemplary system 200 for encouraging the renewal of security-software subscriptions. As illustrated in this figure, exemplary system 200 may comprise a computing system 202 in communication with a server 206 via a network 204.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device. Similarly, server 206 generally represents any type or form of centralized or server-side computing device.

In one example, a computer-security program (such as computer-security program 203 in FIG. 2) may be stored and configured to run on computing system 202. As detailed above, the phrase "computer-security program" may refer to any type or form of computer program designed to identify, detect, neutralize, and/or eliminate vulnerabilities, exploits, or malicious software, such as worms, rootkits, Trojans, phishing attacks, spambots, or the like. In one example, computer-security program 203 may comprise or represent one or more of modules 102 in FIG. 1.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., GSM network), exemplary network architecture 700 in FIG. 7, or the like. Network 204 may facilitate communication or data transfer using wireless or wired connections. In one embodiment, network 204 may facilitate communication between computing system 202 and additional computing systems, such as server 206.

Figure 3:
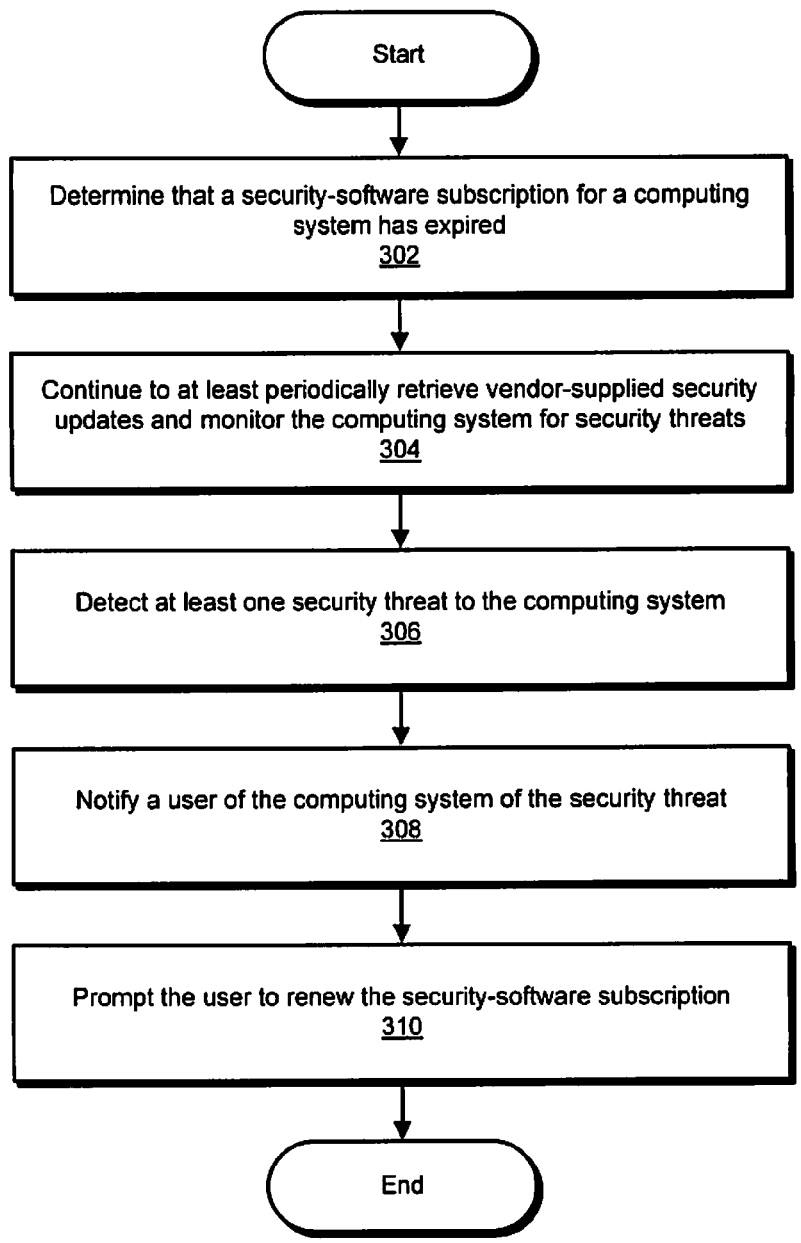
FIG. 3 is a flow diagram of an exemplary computer-implemented method for encouraging the renewal of security-software subscriptions.

FIG. 3 is a flow diagram of an exemplary computer-implemented method 300 for encouraging the renewal of security-software subscriptions. As illustrated in this figure, at step 302 the system may determine that a security-software subscription for a computing system has expired. For example, licensing module 104 in FIG. 1 (which may, as detailed above, represent a portion of computer-security program 203 in FIG. 2) may determine that a subscription to computer-security program 203 on computing system 202 has expired.

The system may perform step 302 in a variety of ways. In one example, licensing module 104 may determine that a user's subscription for computer-security program 203 has expired by communicating with a server (such as server 206 in FIG. 2) maintained by a security vendor. In an additional embodiment, licensing module 104 may determine that a user's subscription for computer-security program 203 has expired by analyzing local content stored on computing system 202 (such as time-stamp files stored on computing system 202).

At step 304, the system may, after determining that the security-software subscription has expired, continue to at least periodically: 1) retrieve vendor-supplied security updates and 2) monitor the computing system for potential security threats. For example, computer-security program 203 in FIG. 2 (which may, as detailed above, comprise security module 106 in FIG. 1) may continue to at least periodically retrieve vendor-supplied security updates and monitor computing system 202 for potential security threats, even after a subscription for computer-security program 203 has expired. The phrase "vendor-supplied security update" may refer to updates supplied by security vendors for their computer-security software programs. Examples of vendor-supplied security updates include, without limitation, virus-definition updates, new antivirus engines, and malware-detection-heuristic updates.

The system may perform step 304 in a variety of ways. In one example, computer-security program 203 may monitor computing system 202 in FIG. 2 by at least periodically scanning computing system 202 for potential security threats. The term "scan" or "security scan" may refer to any analysis performed on a computing system in order to determine whether the computing system is vulnerable to security threats. In some examples, a scan may involve analyzing one or more files, network communications, boot records, processes, or the like on a computing system in order to determine whether any of these objects are malicious or represent security risks. Computer-security program 203 may attempt to determine whether an object on a computing system is malicious in a variety of ways. For example, computer-security program 203 may: 1) determine whether at least a portion of an object on the computing system matches at least one signature within a virus-definition set supplied by a security vendor, 2) determine whether the object triggers a malware-detection heuristic supplied by a security vendor, 3) execute the object within a virtual or emulated computing environment to determine whether the file contains malicious payload, or 4) verify the legitimacy of the object through any other suitable means.

In other examples, computer-security program 203 in FIG. 2 may monitor computing system 202 in real-time for potential security threats. For example, computer-security program 203 may automatically perform a security scan upon detecting certain predetermined events of interest, such as when a user opens an email, inserts a CD, surfs the web, or when a file already on the computer is opened or executed. In this example, computer-security program 203 may analyze an object on computing system 202 each time the object is accessed, even if computer-security program 203 has previously analyzed the same object.

In some examples, the system may periodically monitor a computing system for potential security threats by reducing the frequency with which an otherwise fully-licensed computer-security program on the computing system scans the computing system for potential security threats and/or retrieves vendor-supplied updates for the computer-security program. For example, after determining that its subscription has expired, computer-security program 203 in FIG. 2 may reduce the number and frequency of security scans performed on computing system 202. Similarly, computer-security program 203 may, after determining that its subscription has expired, retrieve vendor-supplied updates (such as virus-definition updates or malware-detection-heuristic updates) from a security vendor with less frequency. In one example, by retrieving vendor-supplied updates with less frequency, computer-security program 203 may reduce its network usage and conserve network costs for the security vendor.

In other examples, the system may continue to scan the computing system for potential security threats and/or retrieve vendor-supplied updates for the computer-security program with the same frequency as occurred prior to expiration of the computer-security-software subscription.

In one example, computer-security program 203 in FIG. 2 may monitor computing system 202 in a manner that is transparent to a user of computing system 202. For example, computer-security program 203 may monitor computing system 202 when computing system 202 is not in use, such as during the middle of the night or during moments of inactivity. Similarly, computer-security program 203 may monitor computing system 202 without generating any visual indicators, such as graphical user interfaces or icons.

At step 306, the system may detect at least one security threat to the computing system after the security-software subscription has expired. For example, computer-security program 203 in FIG. 2 (which may, as detailed above, comprise security module 106 in FIG. 1) may detect at least one security threat on computing system 202 after the user's subscription to computer-security software 203 has expired.

The phrase "security threat," as used herein, may refer to any vulnerability, exploit, or computer program that may damage or otherwise compromise a computing system. Examples of security threats include, without limitation, malware (such as viruses, worms, Trojan horses, rootkits, spyware, crimeware, or the like), malbots (such as spambots), vulnerabilities and exploits in application or system software (such as a buffer exploit in an Internet browser), attacks sent over a network to or from a protected computing system, or any other computer program or vulnerability that may compromise the security of a computing system.

At step 308, the system may notify a user of the computing system of the security threat. For example, computer-security program 203 in FIG. 2 (which may, as detailed above, comprise notification module 108 in FIG. 1) may notify a user of computing system 202 of a detected security threat.

The system may perform step 308 in a variety of ways. In one example, computer-security program 203 in FIG. 2 may notify a user of computing system 202 by displaying a notification on computing system 202 that: 1) identifies the security threat, 2) indicates that the user's security-software subscription has expired, and 3) displays an offer to remove the security threat.

In some examples, computer-security program 203 may offer to remove the detected security threat for free (i.e., without requiring the user to renew his/her security-software subscription). In other examples, the offer may be contingent upon the user renewing his/her security-software agreement. For example, computer-security program 203 may offer to remove the security threat if the user renews his/her security-software subscription.

Figure 4:
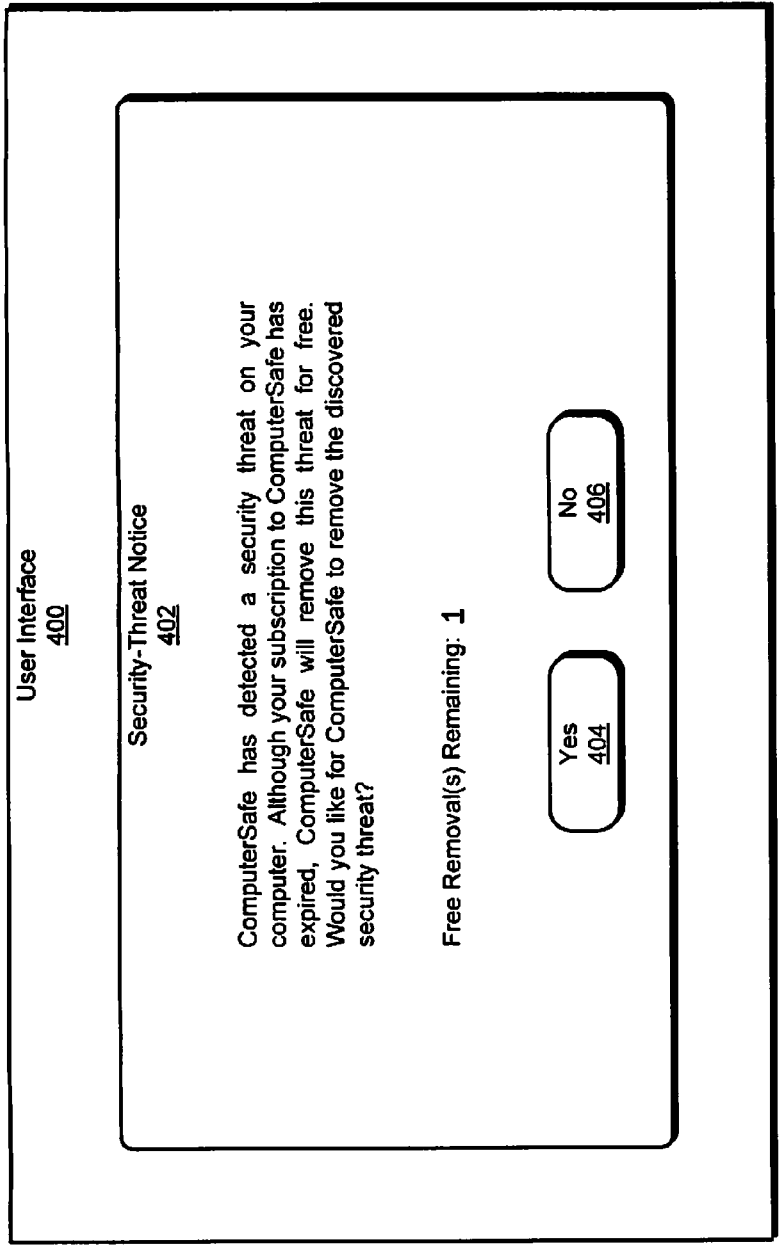
FIG. 4 is an illustration of an exemplary user interface for displaying a notification that identifies a detected security threat on a computing system.

FIG. 4 is an illustration of an exemplary user interface 400 for displaying a notification that identifies a detected security threat on a computing system according to one embodiment. As illustrated in this exemplary figure, security-threat notice 402 may identify a detected security threat, indicate that the user's security-software subscription has expired, and offer to remove the detected threat for free. Computer-security program 203 in FIG. 2 may also display a notification that identifies the number (in this example, one) of free threat removals (also referred to herein as a "threat-removal-expiration count") that remain before the user must renew his/her security-software subscription. A user may then direct computer-security program 203 to remove the detected security threat by selecting user-selectable object 404.

The system may display notifications at a variety of times. For example, computer-security program 203 in FIG. 2 may notify a user upon detecting a security threat. Alternatively, computer-security program 203 may notify the user that a security threat was recently detected on the user's computer only when the user attempts to perform a certain activity (e.g., such accessing the Internet using a web browser).

In some examples, the system may remove the detected security threat. For example, computer-security program 203 in FIG. 2 (which may, as detailed above, comprise security module 106 in FIG. 1) may remove the security threat detected in step 306 from computing system 202.

The system may remove security threats in a variety of ways. For example, computer-security program 203 in FIG. 2 may remove or quarantine a malicious file from computing system 202, apply a patch to remedy a security exploit or vulnerability on computing system 202, or perform any other operation that may remove a security threat on computing system 202. In one example, because some security threats are difficult to remove, computer-security program 203 may attempt to remove the detected security threat and then only display a renewal notice if computer-security program 203 determines that it successfully removed the security threat.

In at least one example, the system may remove the security threat without requiring the user to renew his/her security-software subscription. For example, computer-security program 203 in FIG. 2 may remove a detected security threat from computing system 202 in FIG. 2 without requiring a user of computing system 202 to renew his/her subscription to computer-security program 203. In an additional embodiment, the system may remove the detected security threat contingent upon the user renewing his/her security-software subscription. For example, in some examples computer-security program 203 in FIG. 2 may only remove a detected security threat from computing system 202 if a user of computing system 202 renews his/her subscription to computer-security program 203.

In one example, the system may only remove a subset of all security threats present on the computing system. For example, if computer-security program 203 in FIG. 2 detects ten security threats on computing system 202, then computer-security program 203 may offer to remove one of the detected security threats without requiring that a user of computing system 202 renew his/her subscription to computer-security program 203. Alternatively, the system may remove all security threats present on a computing system.

In some examples, computer-security program 203 may remove the detected security threat in response to a request from a user. For example, upon displaying a notification that identifies the detected security threat, computer-security program 203 may receive a request from a user of computing system 202 to remove the detected security threat. In other examples, the system may remove the security threat prior to notifying the user and independent of any user participation.

At step 310, the system may prompt the user to renew the security-software subscription. For example, computer-security program 203 in FIG. 2 (which may, as detailed above, comprise notification module 108 in FIG. 1) may prompt a user of computing system 202 to renew his/her subscription to computer-security program 203. The phrase "renew," as used herein, may refer to the act of a consumer subscribing, either for the first time (such as upon expiration of a trial or evaluation period) or for a subsequent time, to a security-software service.

Figure 5:
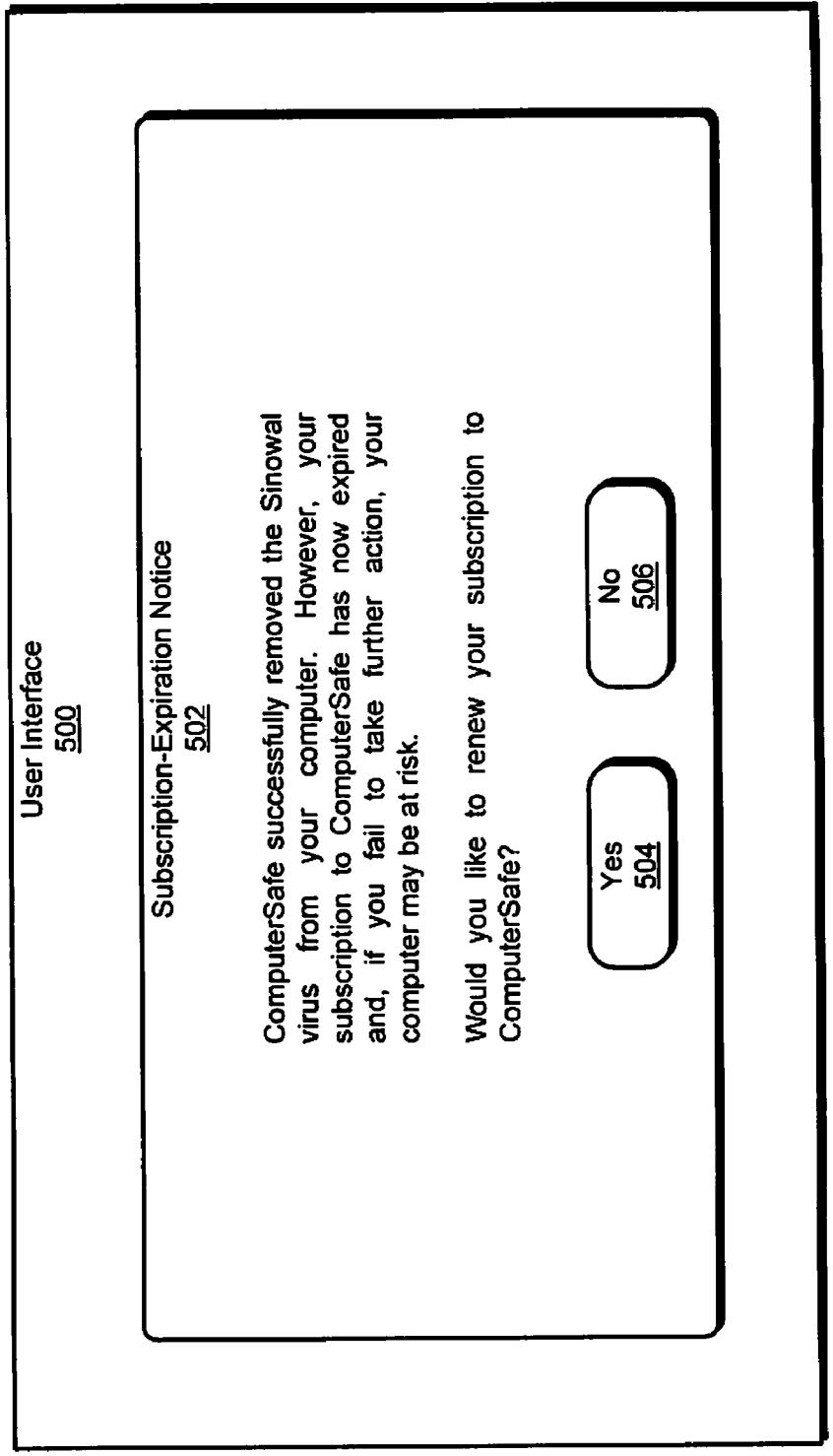
FIG. 5 is an illustration of an exemplary user interface for displaying a renewal notification for a security-software computer program.

FIG. 5 is an illustration of an exemplary user interface for displaying a renewal notification for a security-software computer program according to one embodiment. As illustrated in this figure, in one embodiment subscription-expiration notice 502 may indicate the successful removal of a security threat, indicate that the user's security-software subscription has expired, and prompt the user to renew his/her subscription. In this example, the user may initiate the renewal process for his/her security-software subscription by selecting user-selectable object 504.

In some examples, the system may prompt a user of the computing system to renew his/her security-software subscription by incentivizing the user. For example, computer-security program 203 in FIG. 2 may offer discounts on traditional security-software-subscription prices in an attempt to incentivize a user of computing system 202 to renew his/her subscription.

In one embodiment, the system may prompt a user of the computing system to renew his/her security-software subscription after the system has successfully removed a security threat. The system may also prompt the user to renew his/her security-software subscription at other times, such as upon detecting a security threat after the user's security-subscription has expired. Upon completion of step 310 in FIG. 3, the process flow of exemplary method 300 may terminate.

Although not illustrated in FIG. 3, in certain embodiments exemplary method 300 may also comprise, upon removing the security threat, decrementing a threat-removal-expiration count that identifies how many security threats may be removed before the user is required to renew his/her security-software subscription. For example, computer-security program 203 in FIG. 2 may remove up to three security threats from computing system 202 without requiring that a user of computing system 202 renew his/her subscription to computer-security program 203. In this example, upon detecting and removing a security threat from computing system 202, computer-security program 203 may decrement the threat-removal-expiration count from three to two and so on until the threat-removal-expiration count reaches zero. When the threat-removal-expiration count reaches zero, computer-security program 203 may not remove any further security threats from computing system 202 until a user of computing system 202 renews his/her security-software subscription.

In some examples, exemplary method 300 may also comprise, after determining that the security-software subscription has expired in step 302, removing any indication on the computing system that suggests that the computing system is protected from security threats. For example, as detailed above, computer-security program 203 in FIG. 2 may remove or hide any icons typically displayed by fully-licensed versions of computer-security program 203. Similarly, computer-security program 203 may periodically or regularly display warnings or notifications that indicate that computing system 202 is not protected from malware.

In at least one example, exemplary method 300 in FIG. 3 may also comprise, after determining that the security-software subscription has expired in step 302, reducing the functionality of a computer-security program installed on the computing system. For example, computer-security program 203 in FIG. 2 (which may, as detailed above, comprise functionality-modification module 110 in FIG. 1) may limit the number of functions it may perform prior to a user of computing system 202 renewing his/her security-software subscription.

The system may reduce the functionality of the computer-security program in a variety of ways. For example, functionality-modification module 110 in FIG. 1 may disable the computer-security program's ability to remove security threats, disable the computer-security program's ability to repair damage caused by security breaches, disable the computer-security program's ability to download virus-definition updates, or the like.

In one example, upon determining that the user has renewed his/her security-software subscription, the system may restore full functionality to the computer-security program. For example, functionality-modification module 110 in FIG. 1 may restore full functionality to the fully-licensed version of computer-security program 203 in FIG. 2.

By continuing to at least periodically monitor computing systems for potential security threats, the systems and methods described herein may detect new security threats on computing systems even after security-software subscriptions have expired. Since users may experience security threats after their security-software subscriptions have expired, the systems and methods described herein may provide users with incentive and motivation to renew their security-software subscriptions in order to remove post-expiration security threats. As such, these systems and methods may enable security vendors to substantially increase licensing revenue from computer-security programs.

Figure 6:
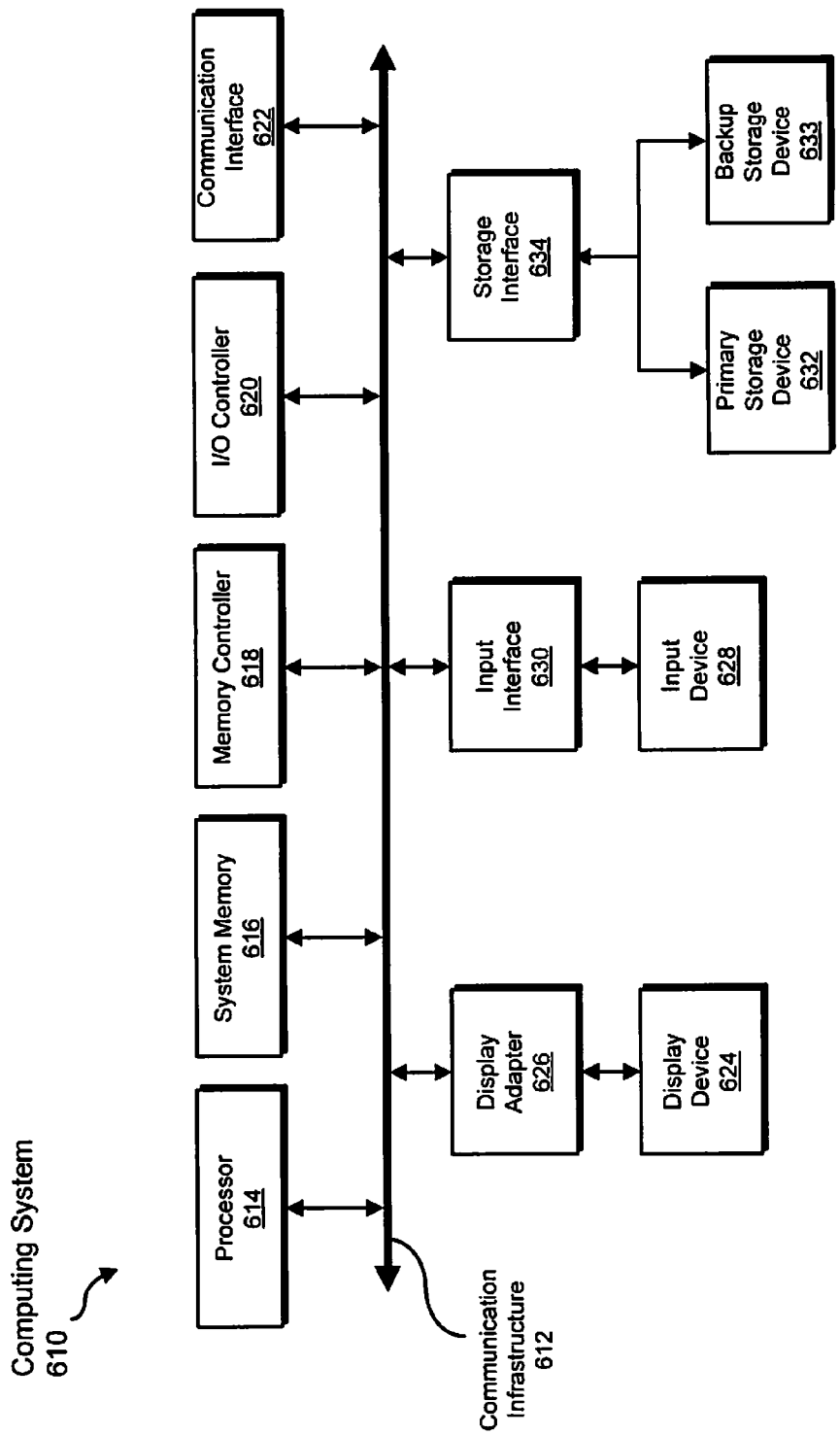
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the determining, retrieving, monitoring, detecting, notifying, removing, prompting, displaying, decrementing, scanning, incentivizing, disabling, and restoring steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as determining, retrieving, monitoring, detecting, notifying, removing, prompting, displaying, decrementing, scanning, incentivizing, disabling, and restoring.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the determining, retrieving, monitoring, detecting, notifying, removing, prompting, displaying, decrementing, scanning, incentivizing, disabling, and restoring steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the determining, retrieving, monitoring, detecting, notifying, removing, prompting, displaying, decrementing, scanning, incentivizing, disabling, and restoring steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the determining, retrieving, monitoring, detecting, notifying, removing, prompting, displaying, decrementing, scanning, incentivizing, disabling, and restoring steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the determining, retrieving, monitoring, detecting, notifying, removing, prompting, displaying, decrementing, scanning, incentivizing, disabling, and restoring steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
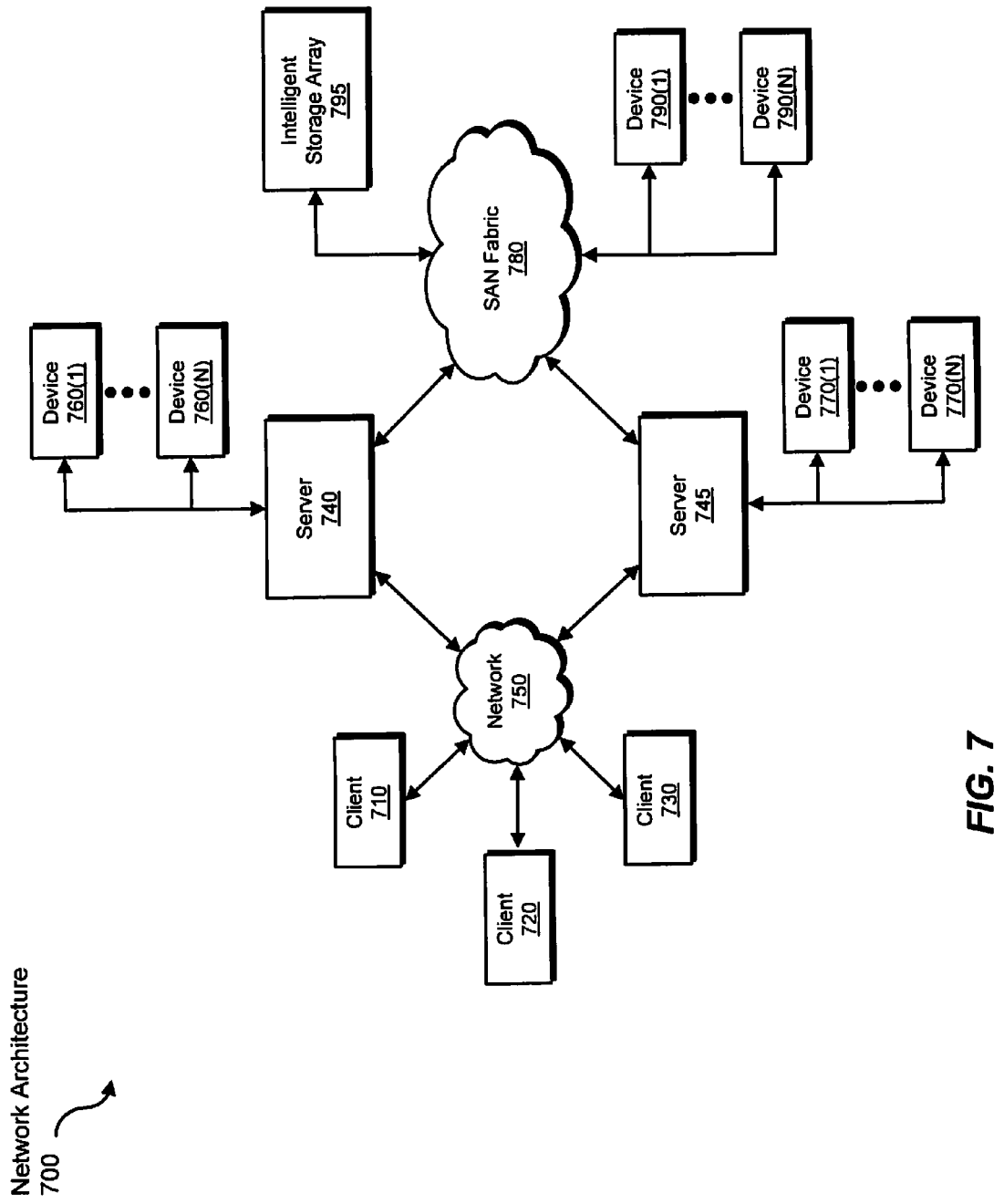
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the determining, retrieving, monitoring, detecting, notifying, removing, prompting, displaying, decrementing, scanning, incentivizing, disabling, and restoring steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for encouraging the renewal of security-software subscriptions. In one example, such a method may comprise: 1) determining that a security-software subscription for a computing system has expired, 2) after determining that the security-software subscription has expired, continuing to at least periodically retrieve vendor-supplied security updates and monitor the computing system for potential security threats, 3) detecting at least one security threat to the computing system, 4) notifying a user of the computing system of the security threat, and then 5) prompting the user to renew the security-software subscription.

In some examples, the method may also comprise removing the security threat. In one example, removing the security threat may comprise removing the security threat only if the user renews the security-software subscription. In other examples, removing the security threat may comprise removing the security threat without requiring renewal of the security-software subscription.

The method may also comprise, upon removing the security threat, decrementing a threat-removal-expiration count that identifies how many security threats may be removed prior to requiring renewal of the security-software subscription. The method may also comprise notifying the user of the threat-removal-expiration count.

In some embodiments, removing the security threat may comprise attempting to remove the security threat and then determining that the security threat was successfully removed. Removing the security threat may also comprise removing a subset of all security threats present on the computing system or removing all security threats present on the computing system.

In one example, notifying the user of the security threat may comprise displaying a notification that comprises: 1) an indication of the security threat, 2) an indication that the security-software subscription has expired, and/or 3) an offer to remove the security threat. The offer to remove the security threat may be contingent upon renewal of the security-software subscription or may offer to remove the security threat without requiring renewal of the security-software subscription. In one example, prompting the user to renew the security-software subscription may comprise incentivizing the user to renew the security-software subscription.

According to some examples, continuing to at least periodically retrieve vendor-supplied security updates may comprise retrieving vendor-supplied security updates with the same frequency as occurred prior to expiration of the security-software subscription. Continuing to at least periodically retrieve vendor-supplied security updates may also comprise at least periodically retrieving vendor-supplied virus-definition updates, new antivirus engines, and/or at least periodically retrieving vendor-supplied malware-detection-heuristic updates.

Similarly, continuing to at least periodically monitor the computing system for potential security threats may comprise at least periodically scanning the computing system for potential security threats or monitoring the computing system in real-time for potential security threats. Continuing to at least periodically monitor the computing system for potential security threats may also comprise transparently monitoring the computing system for potential security threats by, for example, monitoring the computing system when the computing system is not in use and/or monitoring the computing system without generating visible indicators.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for encouraging renewal of security-software subscriptions, at least a portion of the method being performed by a computing system comprising at least one processor, the method comprising:
   determining that a security-software subscription for security software installed on the computing system has expired;
   after determining that the security-software subscription has expired, continuing to at least periodically retrieve vendor-supplied security updates and monitor the computing system for potential security threats;
   detecting at least one security threat to the computing system;
   notifying a user of the computing system of:
      the detected security threat;
      a threat-removal-expiration count that identifies a limited number of security threats that may be removed prior to renewal of the security-software subscription;
   prompting the user to renew the security-software subscription.

2. The method of claim 1, further comprising removing the security threat.

3. The method of claim 2, wherein removing the security threat comprises removing the security threat without requiring renewal of the security-software subscription.

4. The method of claim 1, wherein the threat-removal-expiration count indicates that the number of security threats that may be removed prior to renewal of the security-software subscription is greater than or equal to zero.

5. The method of claim 4, further comprising, upon removing the security threat, decrementing the threat-removal-expiration count.

6. The method of claim 5, further comprising notifying the user of the decremented threat-removal-expiration count.

7. The method of claim 2, wherein removing the security threat comprises:
   attempting to remove the security threat;
   determining that the security threat was successfully removed.

8. The method of claim 2, wherein removing the security threat comprises:
   removing a subset of all security threats present on the computing system;
   removing all security threats present on the computing system.

9. The method of claim 1, wherein notifying the user of the security threat comprises displaying a notification that comprises:
   an indication of the security threat;
   an indication that the security-software subscription has expired;
   an offer to remove the security threat.

10. The method of claim 9, wherein the offer to remove the security threat comprises:
    an offer to remove the security threat contingent upon renewal of the security-software subscription;
    an offer to remove the security threat without requiring renewal of the security-software subscription.

11. The method of claim 1, wherein continuing to at least periodically retrieve vendor-supplied security updates comprises retrieving vendor-supplied security updates with the same frequency as occurred prior to expiration of the security-software subscription.

12. The method of claim 1, wherein continuing to at least periodically retrieve vendor-supplied security updates comprises at least one of:
    at least periodically retrieving vendor-supplied virus-definition updates and engines;
    at least periodically retrieving vendor-supplied malware-detection-heuristic updates.

13. The method of claim 1, wherein continuing to at least periodically monitor the computing system for potential security threats comprises:
    at least periodically scanning the computing system for potential security threats;
    monitoring the computing system in real-time for potential security threats.

14. The method of claim 1, wherein continuing to at least periodically monitor the computing system for potential security threats comprises transparently monitoring the computing system for potential security threats.

15. The method of claim 14, wherein transparently monitoring the computing system comprises at least one of:
    monitoring the computing system when the computing system is not in use;
    monitoring the computing system without generating visible indicators.

16. The method of claim 1, wherein prompting the user to renew the security-software subscription comprises incentivizing the user to renew the security-software subscription.

17. A system for encouraging renewal of security-software subscriptions, the system comprising:
    a licensing module programmed to determine that a security-software subscription for security software installed on a computing system has expired;
    a security module programmed to:
       continue to at least periodically retrieve vendor-supplied security updates and monitor the computing system for potential security threats even after the security-software subscription has expired;
       detect at least one security threat to the computing system;
    a notification module programmed to:
       notify a user of the computing system of:
          the detected security threat;
          a threat-removal-expiration count that identifies a limited number of security threats that may be removed prior to renewal of the security-software subscription;
       prompt the user to renew the security-software subscription;
    at least one processor configured to execute the licensing module, the security module, and the notification module.

18. The system of claim 17, wherein the threat-removal-expiration count indicates that the number of security threats that may be removed prior to renewal of the security-software subscription is greater than or equal to zero.

19. A non-transitory computer-readable storage medium comprising one or more computer-executable instructions that, when executed by a computing device, cause the computing device to:
    determine that a security-software subscription for security software installed on the computing device has expired;
    after determining that the security-software subscription has expired, continue to at least periodically retrieve vendor-supplied security updates and monitor the computing system for potential security threats;

detect at least one security threat to the computing system;
notify a user of the computing system of:
  the detected security threat;
  a threat-removal-expiration count that identifies a limited number of security threats that may be removed prior to renewal of the security-software subscription;
prompt the user to renew the security-software subscription.

20. The non-transitory computer-readable storage medium of claim 19, wherein the threat-removal-expiration count indicates that the number of security threats that may be removed prior to renewal of the security-software subscription is greater than or equal to zero.

\* \* \* \* \*